United States Patent
Covell et al.

(10) Patent No.: US 11,354,822 B2
(45) Date of Patent: Jun. 7, 2022

(54) STOP CODE TOLERANT IMAGE COMPRESSION NEURAL NETWORKS

(71) Applicant: GOOGLE LLC, Mountain View, CA (US)

(72) Inventors: Michele Covell, Woodside, CA (US); Damien Vincent, Zurich (CH); David Charles Minnen, Mountain View, CA (US); Saurabh Singh, Mountain View, CA (US); Sung Jin Hwang, Mountain View, CA (US); Nicholas Johnston, San Jose, CA (US); Joel Eric Shor, Mountain View, CA (US); George Dan Toderici, Mountain View, CA (US)

(73) Assignee: Google LLC, Mountain View, CA (US)

( * ) Notice: Subject to any disclaimer, the term of this patent is extended or adjusted under 35 U.S.C. 154(b) by 180 days.

(21) Appl. No.: 16/610,063

(22) PCT Filed: May 16, 2018

(86) PCT No.: PCT/US2018/033043
§ 371 (c)(1),
(2) Date: Oct. 31, 2019

(87) PCT Pub. No.: WO2018/213499
PCT Pub. Date: Nov. 22, 2018

(65) Prior Publication Data
US 2021/0335017 A1 Oct. 28, 2021

Related U.S. Application Data

(60) Provisional application No. 62/506,993, filed on May 16, 2017.

(51) Int. Cl.
*G06T 9/00* (2006.01)

(52) U.S. Cl.
CPC .................................. *G06T 9/002* (2013.01)

(58) Field of Classification Search
CPC ........ G06T 9/002; H04N 19/00; G06N 3/084;
G06N 3/0454
See application file for complete search history.

(56) References Cited

FOREIGN PATENT DOCUMENTS

| EP | 0962099 B1 * | 7/2002 | ............. H04N 19/60 |
| WO | WO-9908449 A1 * | 2/1999 | ............. H04N 19/63 |

OTHER PUBLICATIONS

Gaidhame et al. "New Approaches for Image Compression Using Neural Network," Journal of Intelligent Learning Systems and Application, vol. 03(04), Jan. 1, 2011, 10 pages.

(Continued)

*Primary Examiner* — Charles T Shedrick
(74) *Attorney, Agent, or Firm* — Fish & Richardson P.C.

(57) ABSTRACT

Methods, systems, and apparatus, including computer programs encoded on computer storage media, for image compression and reconstruction. A request to generate an encoded representation of an input image is received. The encoded representation of the input image is then generated. The encoded representation includes a respective set of binary codes at each iteration. Generating the set of binary codes for the iteration from an initial set of binary includes: for any tiles that have already been masked off during any previous iteration, masking off the tile. For any tiles that have not yet been masked off during any of the previous iterations, a determination is made as to whether a reconstruction error of the tile when reconstructed from binary codes at the previous iterations satisfies an error threshold. When the reconstruction quality satisfies the error threshold, the tile is masked off.

12 Claims, 7 Drawing Sheets

(56) References Cited

OTHER PUBLICATIONS

PCT International Preliminary Report on Patentability issued in International Application No. PCT/US2018/033043, dated Nov. 28, 2019, 9 pages.
PCT International Search Report and Written Opinion issued in International Application No. PCTT/US2018/033043, dated Sep. 20, 2018, 15 pages.
Russakovsky et al. "ImageNet Large Scale Visual Recognition Challenge," arXiv 1409.05753v3, Jan. 30, 2015, 43 pages.
Toderici et al. "Full resolution image compression with recurrent neural Networks," arXiv 1608.05148, Aug. 2016, 9 pages.
Toderici et al. "Variable Rate Image Compression with Recurrent Neural Networks," arXiv 1511.06085, Mar. 1, 2016, 12 pages.

* cited by examiner

STOP CODE TOLERANT IMAGE COMPRESSION NEURAL NETWORKS

BACKGROUND

This specification relates to compressing and reconstructing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence form the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies for image compression and high-quality reconstruction with recurrent, convolutional neural networks using a stop-code tolerant (SCT) approach.

In general, one innovative aspect of the subject matter described in this specification can be embodied in methods that include the actions of compressing and reconstructing images with convolutional neural networks using a stop-code tolerant approach. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

A request may be received to generate an encoded representation of an input image. The encoded representation of the input image may then be generated. The encoded representation may include a respective set of binary codes at each iteration. Each set of binary codes includes a respective subset of binary codes for each of a the tiles in the input image. Generating the encoded representation may include at each iteration, processing an encoder input for the iteration using an encoder neural network and generating a set of binary codes for the iteration. The encoder neural network may be configured to process the encoder input to generate an initial set of binary codes for the iteration. The initial set of binary codes may include a respective subset of initial binary codes for each of the plurality of tiles. The set of binary codes for the iteration may be generated from the initial set of binary codes. Generating the set of binary codes for the iteration may include: for any tiles that have already been masked off during any previous iteration of the iterations, masking off the tile by setting each of the binary codes for the tile in the set of binary codes to zero; for any tiles that have not yet been masked off during any of the previous iterations, determining whether a reconstruction error of the tile when reconstructed from binary codes at the previous iterations satisfies an error threshold; and when the reconstruction quality satisfies the error threshold, masking off the tile by setting each of the binary codes for the tile in the set of binary codes to zero.

Generating the set of binary codes for the iteration may include: when the reconstruction error does not satisfy the error threshold, refraining from modifying the initial binary codes for the tile.

The input image may be compressed by compressing the binary codes in the encoded representation using a data compression algorithm.

The data compression algorithm may be a trained entropy coder.

The compressed input image may be transmitted to a decoder system for decompression of the input image. The encoder neural network may be a recurrent neural network with a binarizer output layer.

The encoder input for a first iteration may be the input image.

The encoder input for each iteration after the first iteration may be a residual image between (i) the input image and (ii) a reconstruction generated by a decoder neural network from the set of binary codes at the previous iteration. The decoder neural network may be a recurrent neural network that is configured to, at each iteration, receive a decoder input comprising the set of binary codes at the iteration and to process the decoder input to generate a reconstruction of the input image.

Determining whether a reconstruction error of the tile when reconstructed from binary codes at the previous iterations satisfies an error threshold may include determining the reconstruction error for a portion corresponding to the tile in the residual image that is the encoder input at the iteration.

Training the decoder neural network may include obtaining a batch of training images. For each iteration and for each training image, the encoder neural network may be used in accordance with current values of parameters of the encoder neural network to generate an initial set of binary codes for the iteration. A set of binary codes may be generated for the iteration and for each training image from the initial set of binary codes in accordance with the error threshold. For the iteration and for each training image, a reconstruction of the training image may be generated by processing the set of binary codes for the iteration and for the training image using the decoder neural network in accordance with current values of parameters of the decoder neural network. For the iteration and for each training image, a residual may be generated between the training image and the reconstruction of the training image for the iteration. For at least one iteration, an artificially high error threshold may be determined. The artificially high error threshold may be higher than the error threshold. For the iteration and for each training image in the batch, a set of forced-masked binary codes may be generated for the iteration and for each training image from the initial set of binary codes in accordance with the artificially high error threshold. For the iteration and for each training image, a forced-mask reconstruction of the training image may be generated by processing the set of forced-mask binary codes for the iteration and for the training image using the decoder neural network in accordance with the current values of parameters of the decoder neural network. For the iteration and for each training image, a forced-mask residual may be generated between the training image and the forced-mask reconstruction of the training image for the iteration. A gradient is determined with respect to the decoder neural network parameters of an objective function that depends on the residuals and the forced-mask residuals and the current values of the decoder neural network parameters may be updated using the gradient.

The gradients may be back propagated into the encoder neural network to update the current values of the encoder neural network parameters.

For the iteration and for each training image, a reconstruction of the training image may be generated by processing the set of binary codes for the iteration and for the training image using the decoder neural network in accordance with current values of parameters of the decoder neural network. Prior to processing, an internal state of the decoder neural network may be set to an internal state of the decoder neural network after processing the set of binary codes for the training image from an immediately preceding iteration.

A forced-mask reconstruction of the training image may be generated for the iteration and for each training image by processing the set of forced-mask binary codes for the iteration and for the training image using the decoder neural network in accordance with the current values of parameters of the decoder neural network. Prior to processing, an internal state of the decoder neural network may be set to an internal state of the decoder neural network after processing the set of binary codes for the training image from an immediately preceding iteration.

Determining an artificially high error threshold may include determining a maximum reconstruction error for any tile of any previous iteration, determining a minimum reconstruction error for any tile of any previous iteration, and determining the artificially high error threshold for the iteration for the maximum reconstruction error, the minimum reconstruction error, and the error threshold.

For the iteration and for each training image, a reconstruction of the training image may be generated by processing the set of binary codes for the iteration and for the training image using the decoder neural network in accordance with current values of parameters of the decoder neural network.

The subject matter described in this specification can be implemented in particular embodiments so as to realize one or more of the following advantages. An image compression and reconstruction system as described in this document uses stop-code tolerant (SCT) recurrent convolutional neural networks for lossy image compression. By using SCT neural networks as described, the system can improve the quality of the lossy compression, i.e., achieve lower true bit-rates for a given recursion count, both pre- and post-entropy coding. For example, the SCT architecture maintains or exceeds image quality at all compression rates compared to joint photographic experts group (JPEG) and to recurrent neural network (RNN) auto-encodes across datasets. Additionally, the SCT technique results in lower variance in image quality across an entire input image.

In conventional techniques using convolutional neural networks to compress images, output codes from neural networks have a fixed symbol dimension ("depth") over the full extent of a compressed image. The described systems, on the other hand, use stop codes and code trimming to improve the data efficiency of the compression, as described above. However, the difficulty in stop codes and code trimming in convolutional recurrent neural networks is that their convolutional nature results in wide spatial dependence on symbols that are omitted due to earlier stop codes. Simple training approaches for stop-code tolerant recurrent neural networks tend to produce blocking artifacts and blurry reconstructions. The blocking artifacts in the areas around the stop-code-induced gaps are due to the recurrent neural network's convolutions relying too heavily on neighbor codes and then failing when those codes are omitted. Blurry reconstructions occur because the learning process attempts to accommodate code trimming even in complicated image pages.

Accordingly, the image compression and reconstruction system of the specification uses a two-pass approach to train recurrent neural networks for high-quality image reconstruction with stop codes and code trimming. On each iteration, the first pass trains a decoder network of the image compression and reconstruction system with binarized code examples that include stop-code masking and the second pass trains the decoder network for accurate reconstructions.

By introducing this two-pass approach, the image compression and reconstruction system allows the network to determine symbol assignments that both satisfy stop code structure and validly represent the input image. The system is also able to adaptively vary the number of symbols transmitted for different parts of a compressed image, based on the underlying content, e.g., fewer symbols are sent for simpler sections of an image and more symbols are sent for sections that are difficult to compress.

The system produces a reconstruction that is much less variable in quality across the image. Since fewer bits are given to simpler regions, more bits can be devoted to more complex areas. This reconstruction does not have high variance quality that tends to lead to lower human-evaluation scores since people prefer more uniform quality in reconstructions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes image compression and reconstruction systems and methods that use a stop-code tolerant approach to compress and reconstruct images.

Image compression is a type of data compression applied to digital images to reduce the cost of storing or transmitting digital images. This image compression may be lossless or lossy. Lossless compression allows original data to be completely reconstructed from the compressed data whereas lossy compression provides reconstruction of an approximation of the original data.

An example image compression and reconstruction system uses a stop-code tolerant approach with recurrent convolutional neural networks for lossy image compression. The system adaptively varies the number of output symbols transmitted for representing parts of a compressed image based on the underlying content of the image. For example, an image may be composed of a blue sky background and a person's face. The blue sky background may be a simple section of the image, requiring few output symbols in order to represent a compressed version of the section, i.e., to allow the section to be accurately reconstructed based on the output symbols. The person's face may be a more difficult section that requires many output symbols to represent a compressed version. The image compression and reconstruction system may therefore send fewer symbols representing the blue sky section of the image and more symbols representing the difficult-to-compress sections, e.g., ones containing the person's face.

Figure 1:
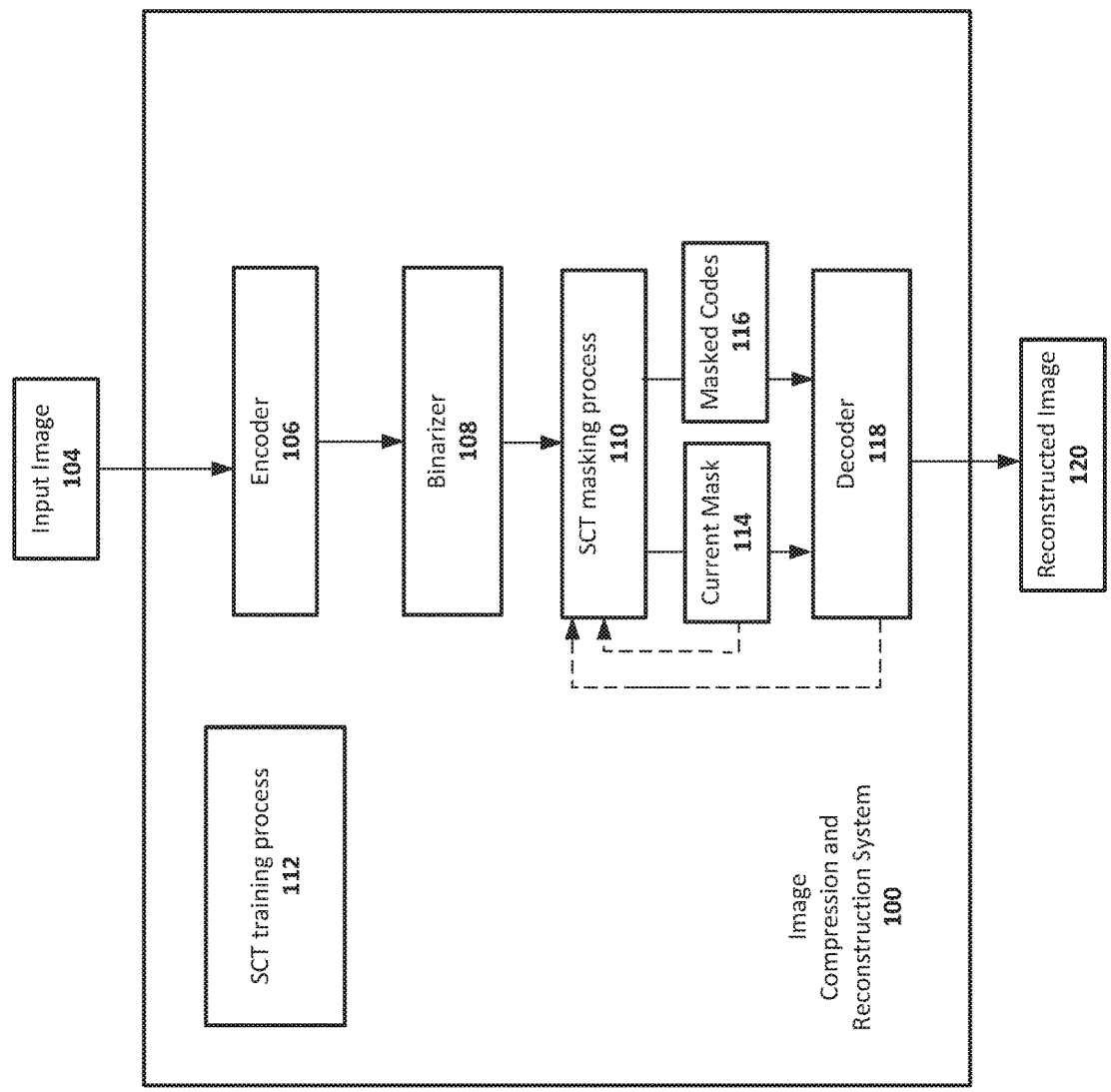
FIG. 1 shows an example image compression and reconstruction system that uses recurrent, convolutional neural networks.

FIG. 1 illustrates an example image compression and reconstruction system 100. The image compression and reconstruction system 100 is an example of a system implemented as computer programs on one or more computers in one or more locations, in which the systems, components, and techniques described below can be implemented.

The system 100 compresses an input image 104 and determines a high-quality image reconstruction of the input image 104 with stop codes and code trimming, allowing for varying amounts of output symbols for different sections of the input image, yet a low variance in image quality across the entire image. While FIG. 1 shows both the encoding and decoding components of the system as part of the same system, in some implementations, the components can be separate systems and located on separate computing devices. For example, in one example implementations, the encoding components, i.e., those components necessary to compress the input image 104, can be located on a server and the decoding components, i.e., those components necessary to reconstruct the input image 104, can be located on a client device.

During operation, the image compression and reconstruction system 100 takes in an input image 104 to be compressed.

The system 100 then compresses the input image 104 by generating a respective set of binary codes at each of multiple iterations.

In particular, at each iteration, an encoder neural network 106 receives an encoder input for the iteration and encodes the encoder input to generate a set of binary codes for each section, or tile, of the input image that represent the encoded version of the tile. At the first iteration, the encoder input is the input 104. At each iteration after the first iteration, the encoder input is a residual image from the preceding iteration. The encoder neural network 106 and generating the residual image will be described in more detail below with reference to FIG. 5.

At each iteration, the system 100 applies a stop code tolerant (SCT) masking process 110 to enforce stop-code behaviors. The process takes in the binary codes from the binarizer 108 along with a current mask as of the iteration and, if available, a residual image in order to produce masked codes 116.

After all of the iterations have been completed, the resulting masked codes, i.e., data that specifies the full set of masked codes for each tile from all of the iterations, are provided to a decoder 118 in order for the decoder 118 to reconstruct a full H×W image 120 using depth-to-space shuffling. In some implementations, the system 100 further compresses the input image by compressing the final set of masked codes using a data compression algorithm before transmitting the compressed set of binary codes for reconstruction. The data compression algorithm may be a trained entropy coder or a hard-coded entropy coder.

The number of encoding iterations performed by the system 100 can be fixed or the system can continue performing encoding iterations until each tile of the image can be reconstructed by the decoder 118 to satisfy a target quality.

The decoder will be discussed in more detail with respect to FIG. 4.

The image compression and reconstruction system 100 also includes a SCT network training engine 112 that trains the decoder neural network and the encoder neural network, jointly. This training process will be discussed in more detail with respect to FIG. 6.

Figure 2:
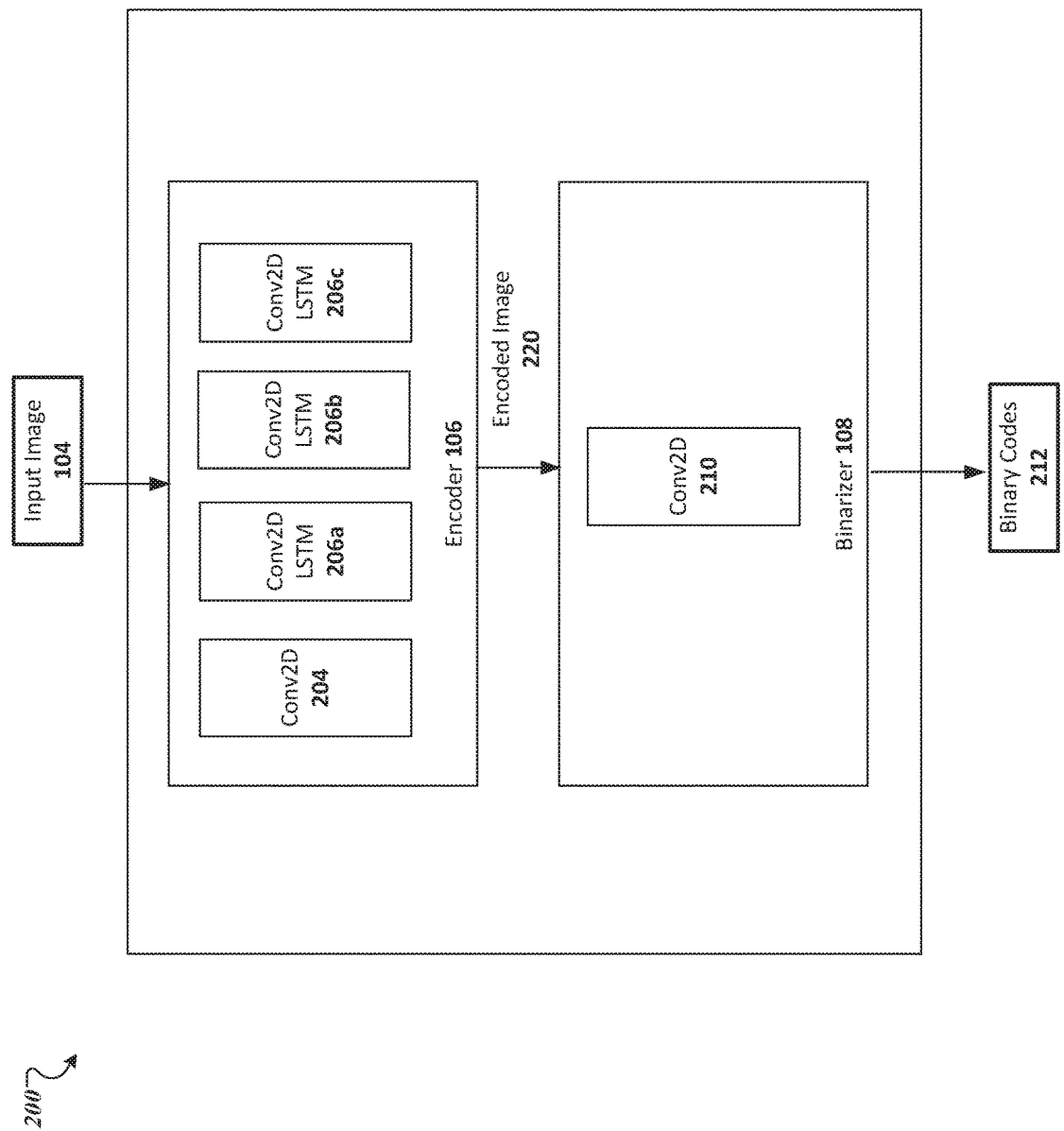
FIG. 2 shows an example encoder and binarizer for compressing images.

FIG. 2 illustrates an example encoder 106 and binarizer 108 for compressing images. The encoder 106 is a recurrent convolutional neural network that contains several 2-dimensional convolution layers (204, 206) that each perform spatial convolution over images. Example recurrent architectures for the encoder neural networks are described in G. Toderici, D. Vincent, N. Johnston, S. J. Hwang, D. Minnen, J. Shor, and M. Covell, "Full resolution image compression with recurrent neural networks," CoRR, vol. abs/1608.05148, 2016, the entire contents of which are hereby incorporated by reference herein in their entirety. The encoder neural network 106 interleaves long short-term memory (LSTM) units (206a-c) with spatial downsampling, e.g., four layer spatial downsampling. Although an example architecture for the example encoder neural network 106 is illustrated in FIG. 2, the encoder neural network 106 is not limited to this architecture.

In execution, the encoder 106 takes in an H×W input image 104 or a residual image from a previous iteration of the encoding process and produces an encoded representation of the image 220, e.g. H/16×W/16 representation, using the spatial downsampling.

As discussed above, the binarizer 108 converts the encoded image 220 into binary codes 212. The binarizer 108 uses a 2-dimensional convolution layer 210 to perform this conversion. Spatial downsampling in the encoder 106 results in the binarizer 108 outputting one stack of codes for each spatial 'tile' from the input image 104, e.g., outputting one stack of (0/1) codes for each 16×16 spatial 'tile' from the input image 104.

Figure 3:
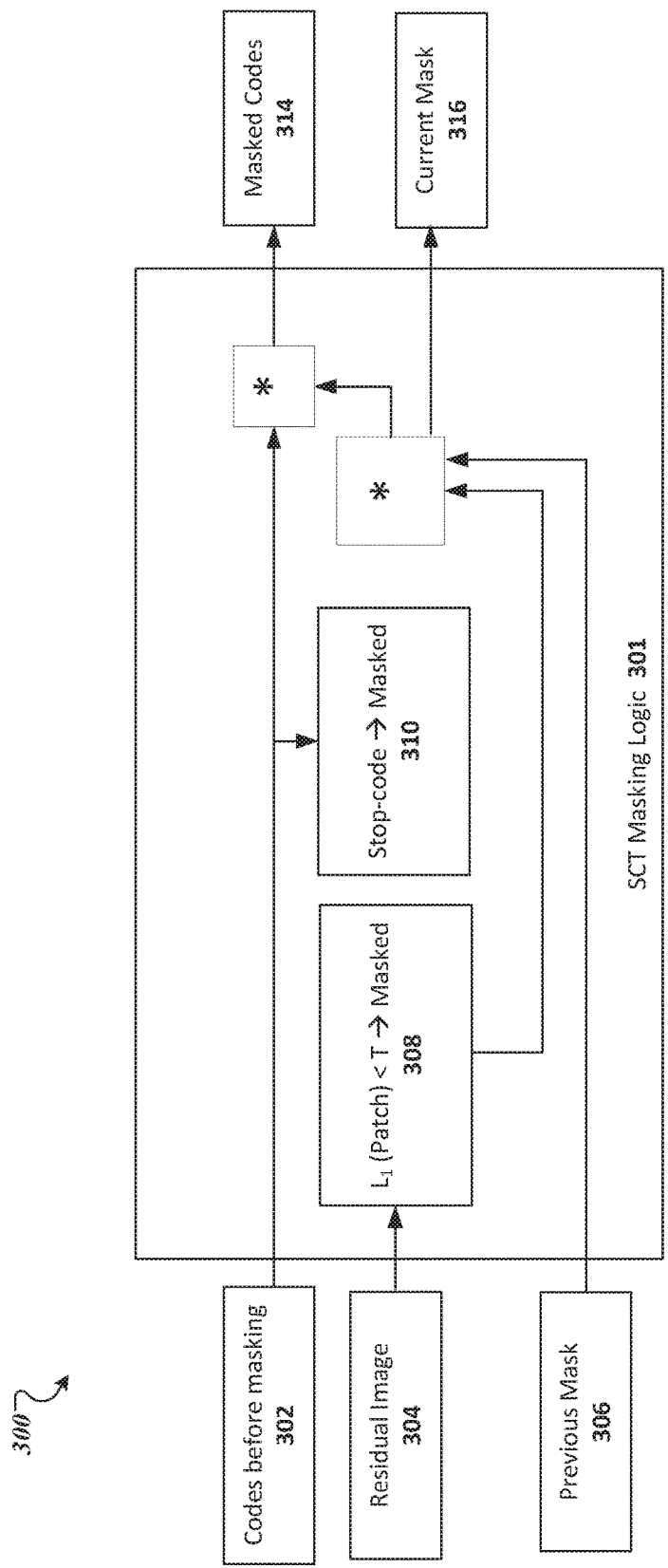
FIG. 3 shows an example of SCT-network masking logic to compress and reconstruct images.

FIG. 3 illustrates an example stop code tolerant masking logic 301. The masking logic is executed at the end of each encoding iteration for each tile representing a portion of the input image 104. The stop code tolerant masking logic 301 takes in the binary codes for a tile before masking 302 and determines whether to mask the tile.

The masking logic 301 masks a tile in one of several instances. Masking a tile refers to setting all of the binary codes for the tile from the current iteration to zero.

For example, the masking logic 301 masks a tile when a reconstruction quality for the tile exceeds a target quality level for a reconstructed image 308. The reconstruction quality for the tile is the value of the reconstruction error between the tile in the residual image and the original input image. The target quality level is predetermined. The masking logic 301 determines whether a reconstruction error of the tile, when reconstructed from binary codes at the previous iterations, satisfies the defined target quality level. If the reconstruction quality satisfies the error threshold, the masking logic 301 masks the tile by setting each of the binary codes for the tile to zero. When the reconstruction error does not satisfy the error threshold, the system refrains from modifying the initial binary codes for the tile.

The masking logic additionally or alternatively masks a tile when the output of the encoder network for the iteration is a stop code, i.e., a set of binary codes for a tile in which all the bits are set to zero. The masking logic 301 compares the codes before masking 302 to the stop code 310. If the codes match the stop code, the masking logic 301 updates the current mask to indicate that the tile is now masked.

The masking logic 301 may additionally or alternatively determine that the codes for the iteration were masked on an earlier iteration. The masking logic 301 makes this determination by checking to see if the stop codes from the previous iteration for the tile are all zero or by checking the current mask. If the codes were masked at a previous, the masking logic 301 masks the tile by setting each of the binary codes for the tile to zero for this iteration. That is, once a tile is masked at a given iteration of the encoding process, the masking logic 301 continues to mask the tile at all subsequent iterations.

Figure 4:
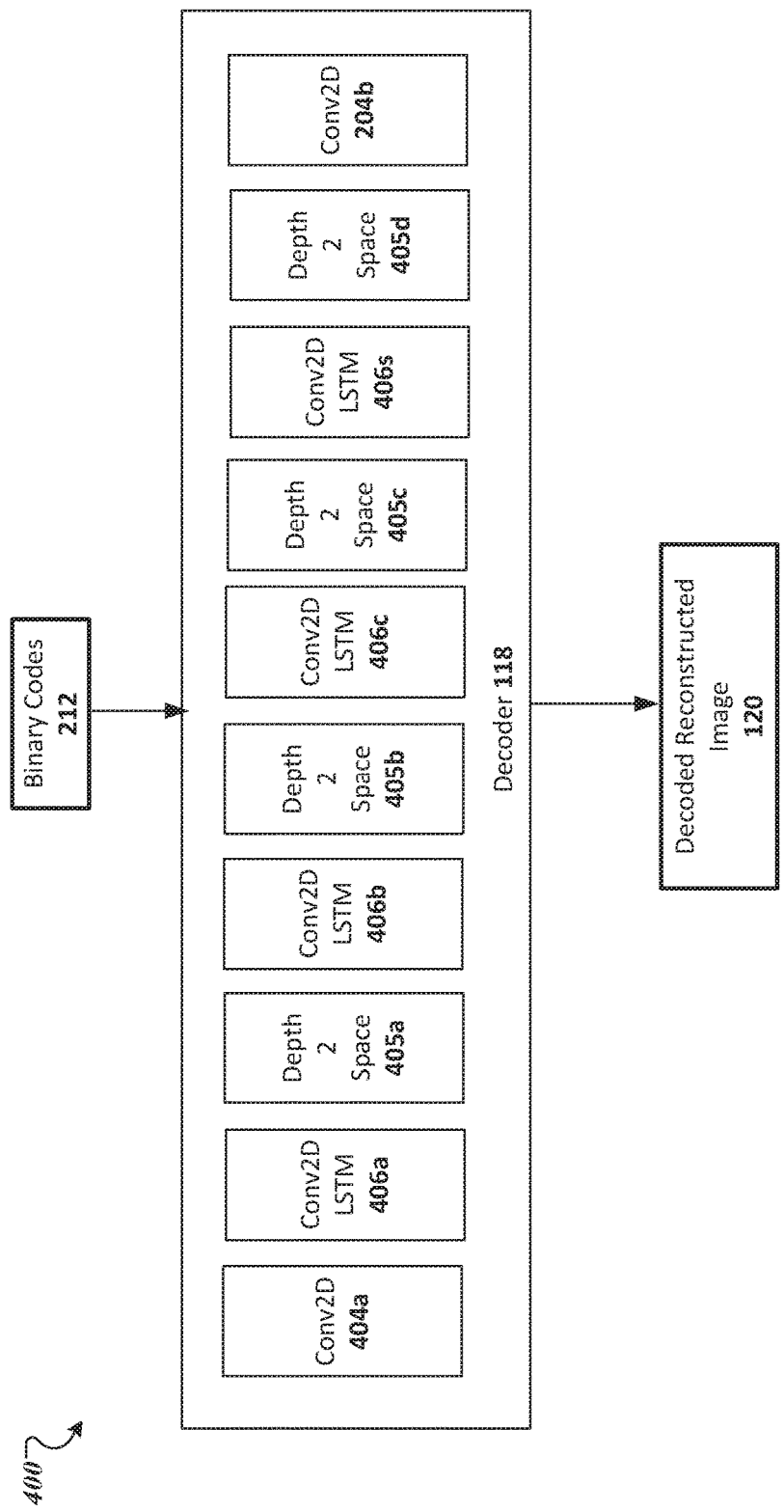
FIG. 4 shows an example decoder for creating high-quality image reconstructions using SCT-network techniques.

FIG. 4 shows an example of a decoder for creating high-quality reconstructions of the input image. The decoder neural network 118, as described above, contains several 2-dimensional convolution layers (404, 406), e.g., spatial convolution over images. The decoder neural network interleaves long short-term memory (LSTM) units (406a-d) with depth-to-space shuffling 405a-d. Example recurrent architectures for the decoder neural networks are described in G. Toderici, D. Vincent, N. Johnston, S. J. Hwang, D. Minnen, J. Shor, and M. Covell, "Full resolution image compression with recurrent neural networks," CoRR, vol. abs/1608.05148, 2016, the entire contents of which are hereby incorporated by reference herein in their entirety.

Figure 5A:
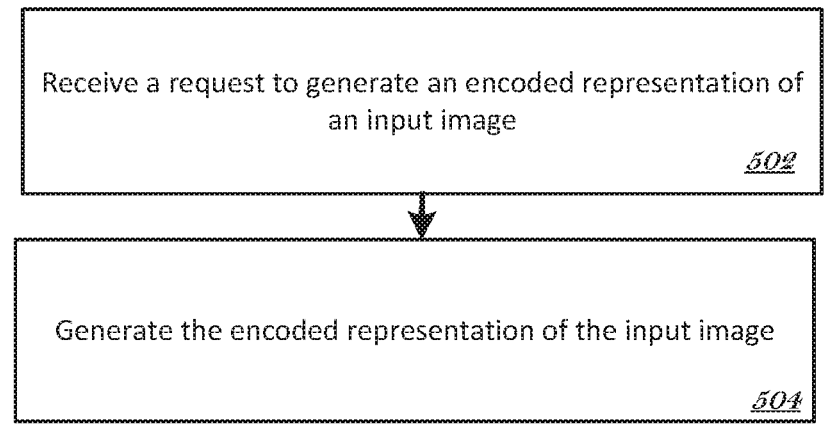
FIG. 5a illustrates an example process for masking tiles of an input image.
Figure 5B:
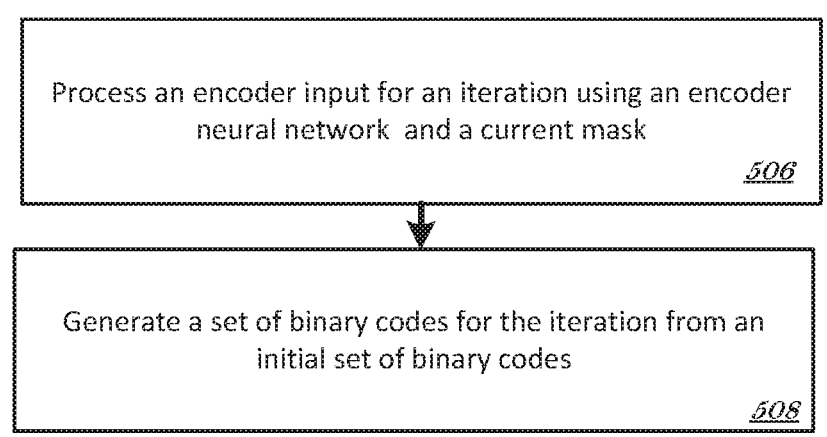
FIG. 5b illustrates an example process for masking tiles of an input image.
Figure 5C:
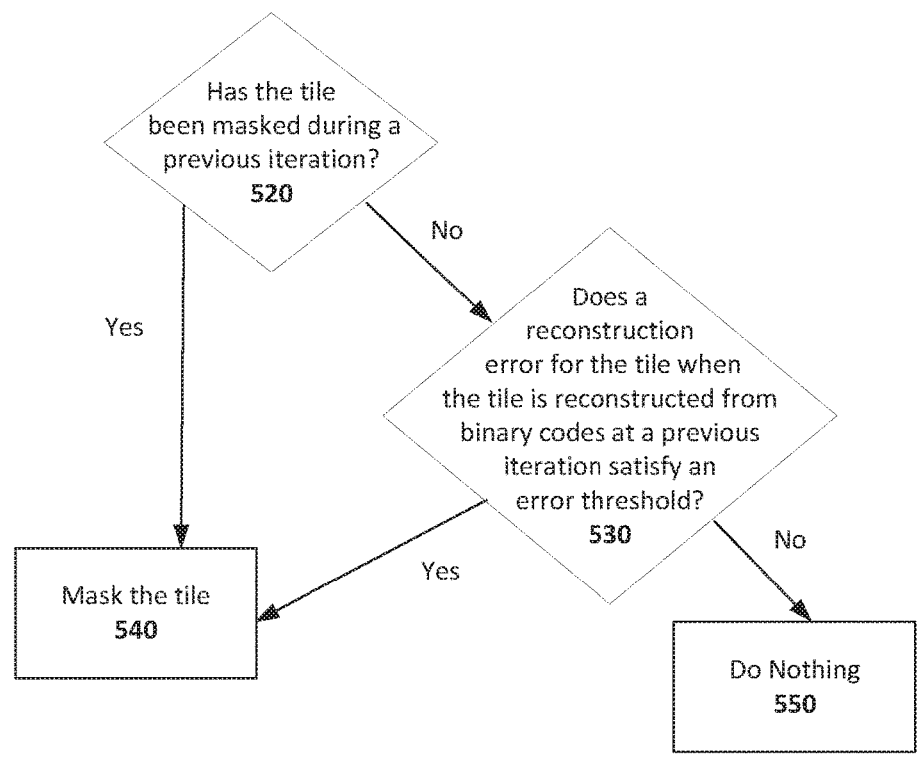
FIG. 5c illustrates an example process for masking tiles of an input image.

FIG. 5a-c are flowcharts of an example process 500 for compressing and reconstructing an image to enforce stop code behavior. For convenience, the process 500 will be described as being performed by a system of one or more computers, located in one or more locations, and programmed appropriately in accordance with this specification. For example, an image compression and reconstruction system, e.g., the image compression and reconstruction system 100 of FIG. 1, appropriately programmed, can perform the process 500.

As illustrated in FIG. 5, the image compression and reconstruction system receives a request to generate an encoded representation of an input image 502. The system then begins an iterative process to provide a compressed, reconstructed representation of the input image.

At each iteration of process 500, the system processes an input using the encoder to generate an initial set of binary codes for the iteration.

For the first iteration, the input is the input image. In this first iteration, the system processes the input image to generate an encoded representation of the input image in the form of a set of binary codes 504.

The system then generates a final set of binary codes for this first iteration based on the initial set of binary codes and the current mask (506, 508) and updates the current mask to indicate if any tiles were masked off at the first iteration. The current mask for the first iteration indicates that none of the tiles have been masked.

The system generates a reconstruction of the input image using the final set of binary codes for the first iteration and then uses the reconstruction to compute a residual image. The residual image is the image that results from the difference between the input image and the reconstruction generated from the initial set of binary codes.

For each subsequent iteration, the system uses the residual image from the previous iteration as the process input. The system then processes the residual image to generate an initial set of binary codes for the current iteration. The system generates the final set of binary codes based on the initial set of binary codes for the iteration, the residual image from the previous iteration, and the current mask. In order to determine the final set of binary codes for the iteration, the system first determines whether any tiles of the input image, i.e. the residual image from the previous iteration, were already masked off at an earlier iteration.

Referring to FIG. 5c, for each tile of the image that has already been masked off, the system masks the tile in this iteration by changing all the bits representing the tile in this iteration to zero (520, 540). For each tile of the image that has not already been masked off, the system determines whether the reconstruction error, between the residual image and the actual image satisfies an error threshold 530. The system is provided with this defined error threshold or the error threshold can be dynamically determined. If the reconstruction error satisfies the error threshold, the system masks off the tile 540. Otherwise, the system does nothing 550. To determine whether the reconstruction error satisfies a threshold, the system computes the reconstruction loss between the current tile in the residual image for the iteration and the current tile in the actual image.

The reconstruction loss can be any distortion measurements that are useful in determining local image-reconstruction quality. Classic examples of these loss measures are L2 error, inverse PSNR, or inverse Structural Similarity (SSIM). Newer measurements include the separation distance in the embedding spaces that are formed at each layer within neural networks that have been trained for general recognition tasks, e.g., VGG as described in O. Russakovsky, J. Deng, H. Su, J. Krause, S. Satheesh, S. Ma, Z. Huang, A. Karpathy, A. Khosla, M. Bernstein, A. Berg, L. Fei-Fei, "ImageNet Large Scale Visual Recognition Challenge," CoRR, vol. abs/1409.0575, 2015.

If the reconstruction loss is less than the threshold, the system masks the binary code representing the tile. In some implementations, the system uses a quality measure, that is not the reconstruction loss, in which higher values are better. In these implementations, the system determines whether the reconstruction value, e.g., the quality, is greater than the threshold. The system also determines whether the network has emitted stop codes, i.e. the initial set of binary codes is all zero, for the current tile. If the network has emitted stop codes for the current tile, the system does not change the binary codes. The tile will therefore always be masked off in subsequent iterations.

The system processes the final set of binary codes to generate a reconstruction. The system then uses the reconstruction to compute the residual image for use in the next iteration.

This process continues for a fixed number of iterations or until all of the tiles are masked off, depending on the implementation. Since the process is iterative, after each iteration, the system continues to add more and more binary codes for each tile, except in cases where the tile has been masked off. Then, the new codes are always stop codes for the tile.

To train the decoder neural network and, optionally, the encoder neural network, the system optimizes an objective function that depends on residuals generated from binary codes generated using the error threshold and residuals generated from binary codes generated using an artificially high error threshold. If the encoder is also being trained, the system then backpropagates gradients from the decoder into the encoder.

The system uses a training loss that includes the reconstruction loss as well as a penalty for non-zero bits in the binary codes. This penalty biases the code distributions towards zero bits, making entropy compression more effective.

In particular, during the training, the system optimizes a combined loss function from two interleaved reconstruction passes: one pass to train the neural network for accurate reconstructions and a second pass to train for stop-code tolerance. Without the stop code tolerant pass, the network would not see masked codes and code trimming until late in the training process. The network is then less able to adjust to the masked codes without artifacts since the networks have already made symbol assignments at the binarizer that cannot conform to an all-zero stop code.

As part of optimizing the combined loss function, the system obtains a batch of training images to train the neural network.

For each encoding iteration and for each training image in the batch, the system processes an encoder input for the iteration and for the training image using the encoder neural network in accordance with current values of parameters of the encoder neural network to generate an initial set of binary codes for the iteration. The system generates a set of binary codes from the initial set of binary codes in accordance with the error threshold. The system then generates a reconstruction of the training image by processing the set of binary codes using the decoder neural network in accordance with current values of parameters of the decoder neural network. The system generates a residual between the training image and the reconstruction of the training image for the iteration.

For at least one of the encoding iterations, the system determines an artificially high error threshold for the iteration which is higher than the error threshold. That is, the artificially high error threshold imposes a less stringent requirement on reconstruction quality than the actual error threshold so that tiles in the image are more likely to be masked off. For each of the at least one iterations and for each training image in the batch, the system generates a set of forced mask binary codes for the iteration from the initial set of binary codes in accordance with the artificially high error threshold, i.e., instead of using the actual error threshold that will be used after training. For the iteration and for each training image, the system generates a forced-mask reconstruction of the training image by processing the set of forced-mask binary codes for the iteration and for the training image using the decoder neural network in accordance with the current values of parameters of the decoder neural network. For the iteration and for each training image, the system generates a forced-mask residual image between the training image and the forced mask reconstruction of the training image for the iteration. The system also generates a residual image for the iteration using the actual error threshold and the actual masked codes for the iteration.

The system then determines a gradient with respect to the decoder neural network parameters of an objective function that depends on the residuals and the forced-mask residuals and updates the current values of the decoder neural network parameters using the gradient.

In some implementations, the gradients may be back-propagated into the encoder neural network to update the current values of the encoder neural network parameters.

Figure 6:
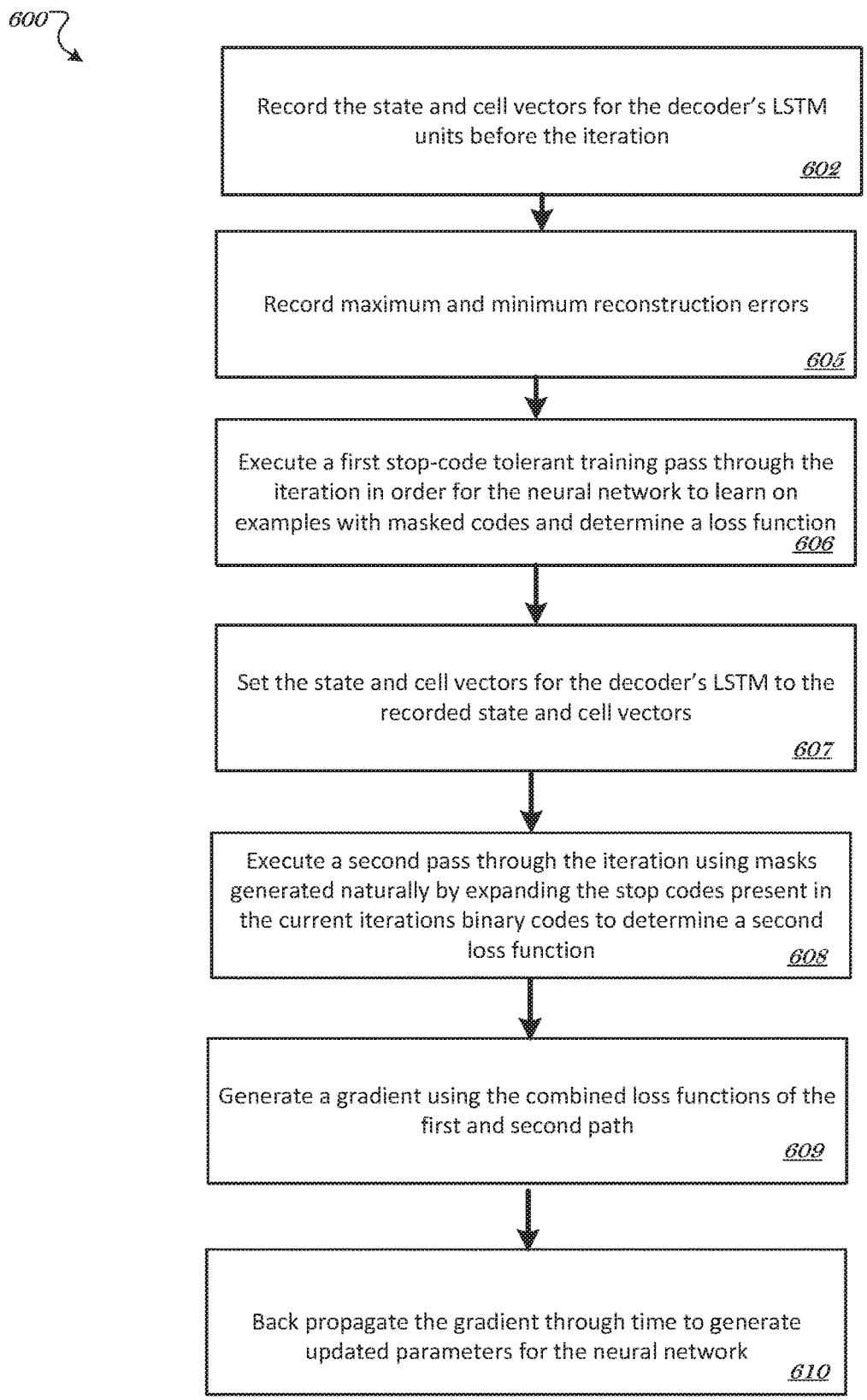
FIG. 6 illustrates an example process for training a neural network in the image compression and reconstruction system.

In more detail and referring to FIG. 6, the training process 112 of system 100 records the state, $S^{k-1}$, and cell, $C^{k-1}$, vectors for all of the decoder's LSTM units just before the kth iteration for each mini-batch in the training data set 604. The system also records $E_{max}^{k-1}$ and $E_{min}^{k-1}$ and the maximum and minimum reconstruction errors on the mini batch 605. The system then executes the kth iteration twice. First, the system executes a stop-code tolerant training pass through the iteration in order to allow the neural network to learn on examples with masked codes 606. In some implementations, to present the network with reasonable examples of masked codes, the system sets an artificially high masking threshold, creating an artificial mask that will always have some masked-off areas. In the masked-off areas, the system resets all of the bits that will be seen by the decoder to zero. The system sets the artificially high masking threshold to $(k/K*(E_{max}^{k-1}-E_{min}^{k-1})+E_{min}^{k-1})$ where K is the maximum number of iterations which the system trains. The system adds the $L_1$ reconstruction error of the output generated by the forced-mask iterations to the reconstruction error loss from the natural mask reconstruction of the second pass.

The system then restores the LSTM memory to $S^{k-1}$ and $C^{k-1}$ so that the previous, forced-masking, pass through the kth iteration does not impact the system results 607. The system then executes a second pass through the iteration 608. In the second pass, the system uses the masks generated naturally by expanding the previous iteration's mask according to the stop codes present in the current iteration's binary codes.

The system uses the reconstruction to form the main reconstruction error and its corresponding loss. The system then records $S^k$, $C^k$, $^{-1}$, and $^{-1}$ values from this natural decoding before the next iteration. The system generates a gradient using the combined loss functions of the first and second path 609 as described above. The combined loss function adds together (or otherwise combines) the reconstruction losses of the naturally masked reconstruction, without the artificially high threshold to decide masking, and the reconstruction losses of the forced masking reconstruction, the masking induced by the artificially high threshold. Then, the system back propagates the gradient through time to generate updated parameters for the neural network 610.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment one is a method comprising: receiving a request to generate an encoded representation of an input image; and generating the encoded representation of the input image, wherein the encoded representation includes a respective set of binary codes at each of a plurality of iterations, wherein each set of binary codes includes a respective subset of binary codes for each of a plurality of tiles in the input image, and wherein the generating comprises, for each of the plurality of iterations: processing an encoder input for the iteration using an encoder neural network, wherein the encoder neural network is configured to process the encoder input to generate an initial set of binary codes for the iteration, the initial set of binary codes including a respective subset of initial binary codes for each of the plurality of tiles; and generating the set of binary codes for the iteration from the initial set of binary codes, comprising: for any tiles that have already been masked off during any previous iteration of the plurality of iterations: masking off the tile by setting each of the binary codes for the tile in the set of binary codes to zero; for any tiles that have not yet been masked off during any of the previous iterations of the plurality of iterations: determining whether a reconstruction error of the tile when reconstructed from binary codes at the previous iterations satisfies an error threshold; and when the reconstruction quality satisfies the error threshold, masking off the tile by setting each of the binary codes for the tile in the set of binary codes to zero.

Embodiment 2 is the method of embodiment 1, wherein generating the set of binary codes for the iteration further comprises: when the reconstruction error does not satisfy the error threshold, refraining from modifying the initial binary codes for the tile.

Embodiment 3 is the method of any one of embodiments 1 or 2, further comprising: compressing the input image by compressing the binary codes in the encoded representation using a data compression algorithm.

Embodiment 4 is the method of embodiment 3, wherein the data compression algorithm is a trained entropy coder.

Embodiment 5 is the method of embodiment 3 or 4, further comprising: transmitting the compressed input image to a decoder system for decompression of the input image.

Embodiment 6 is the method of any one of embodiments 1-5, wherein the encoder neural network is a recurrent neural network with a binarizer output layer.

Embodiment 7 is the method of embodiment 6, wherein the encoder input for a first iteration of the plurality of iterations is the input image.

Embodiment 8 is the method of any one of embodiments 6 or 7, wherein the encoder input for each iteration of the plurality of iterations after the first iteration is a residual image between (i) the input image and (ii) a reconstruction generated by a decoder neural network from the set of binary codes at the previous iteration, wherein the decoder neural network is a recurrent neural network that is configured to, at each of the plurality of iterations, receive a decoder input comprising the set of binary codes at the iteration and to process the decoder input to generate a reconstruction of the input image.

Embodiment 9 is the method of embodiment 8, wherein determining whether a reconstruction error of the tile when reconstructed from binary codes at the previous iterations satisfies an error threshold comprises: determining the reconstruction error for a portion corresponding to the tile in the residual image that is the encoder input at the iteration.

Embodiment 10 is a method of training the decoder neural network of any one of embodiments 8 or 9, the method comprising: obtaining a batch of training images; and for each of the plurality of iterations and for each training image using the encoder neural network in accordance with current values of parameters of the encoder neural network to generate an initial set of binary codes for the iteration; generating a set of binary codes for the iteration and for each training image from the initial set of binary codes in accordance with the error threshold; for the iteration and for each training image, generating a reconstruction of the training image by processing the set of binary codes for the iteration and for the training image using the decoder neural network in accordance with current values of parameters of the decoder neural network; and for the iteration and for each training image, generating a residual between the training image and the reconstruction of the training image for the iteration; for at least one of the plurality of iterations: determining an artificially high error threshold for the iteration, wherein the artificially high error threshold is higher than the error threshold; for each of the at least one iterations and for each training image in the batch: generating a set of forced-mask binary codes for the iteration and for each training image from the initial set of binary codes in accordance with the artificially high error threshold; for the iteration and for each training image, generating a forced-mask reconstruction of the training image by processing the set of forced-mask binary codes for the iteration and for the training image using the decoder neural network in accordance with the current values of parameters of the decoder neural network; and for the iteration and for each training image, generating a forced-mask residual between the training image and the forced mask reconstruction of the training image for the iteration; determining a gradient with respect to the decoder neural network parameters of an objective function that depends on the residuals and the forced-mask residuals; and updating the current values of the decoder neural network parameters using the gradient.

Embodiment 11 is the method of embodiment 10, further comprising:

backpropagating the gradients into the encoder neural network to update the current values of the encoder neural network parameters.

Embodiment 12 is the method of any one of embodiments 10 or 11, wherein, for the iteration and for each training image, generating a reconstruction of the training image by processing the set of binary codes for the iteration and for the training image using the decoder neural network in accordance with current values of parameters of the decoder neural network comprises: prior to the processing, setting an internal state of the decoder neural network to an internal state of the decoder neural network after processing the set of binary codes for the training image from an immediately preceding iteration in the plurality of iterations.

Embodiment 13 is the method of embodiment 12, wherein, for the iteration and for each training image, generating a forced-mask reconstruction of the training image by processing the set of forced-mask binary codes for the iteration and for the training image using the decoder neural network in accordance with the current values of parameters of the decoder neural network comprises: prior to processing, setting an internal state of the decoder neural network to an internal state of the decoder neural network after processing the set of binary codes for the training image from an immediately preceding iteration in the plurality of iterations.

Embodiment 14 is the method of any one of embodiments 10-13, wherein determining an artificially high error threshold for the iteration comprises: determining a maximum reconstruction error for any tile of any previous iteration of the plurality of iterations; determining a minimum reconstruction error for any tile of any previous iteration of the plurality of iterations; and determining the artificially high error threshold for the iteration for the maximum reconstruction error, the minimum reconstruction error, and the error threshold.

Embodiment 15 is a system comprising one or more computers and one or more storage devices storing instructions that when executed by the one or more computers cause the one or more computers to perform the operations of the respective method of any one of embodiments 1-14.

Embodiment 16 is one or more computer storage media storing instructions that when executed by one or more computers cause the one or more computers to perform the operations of the respective method of any one of embodiments 1-14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. In some implementations, the underlying network does not need to be recurrent and loss does not need to be determined by traditional methods. Instead, loss can be based on learned measurements.

What is claimed is:

1. A computer-implemented image compression and reconstruction method comprising:
   receiving a request to generate an encoded representation of an input image; and
   generating the encoded representation of the input image, wherein the encoded representation includes a respective set of binary codes at each of a plurality of iterations, wherein each set of binary codes includes a respective subset of binary codes for each of a plurality of tiles in the input image, and wherein the generating comprises, for each of the plurality of iterations:
      processing an encoder input for the iteration using an encoder neural network, wherein the encoder neural network is configured to process the encoder input to generate an initial set of binary codes for the iteration, the initial set of binary codes including a respective subset of initial binary codes for each of the plurality of tiles; and
      generating the set of binary codes for the iteration from the initial set of binary codes, comprising:
         for any tiles that have already been masked off during any previous iteration of the plurality of iterations:
            masking off the tile by setting each of the binary codes for the tile in the set of binary codes to zero;
         for any tiles that have not yet been masked off during any of the previous iterations of the plurality of iterations:
            determining whether a reconstruction error of the tile when reconstructed from binary codes at the previous iterations satisfies an error threshold; and
            when the reconstruction quality satisfies the error threshold, masking off the tile by setting each of the binary codes for the tile in the set of binary codes to zero.

2. The method of claim 1, wherein generating the set of binary codes for the iteration further comprises:
   when the reconstruction error does not satisfy the error threshold, refraining from modifying the initial binary codes for the tile.

3. The method of claim 1, further comprising:
   compressing the input image by compressing the binary codes in the encoded representation using a data compression algorithm.

4. The method of claim 3, wherein the data compression algorithm is a trained entropy coder.

5. The method of claim 3, further comprising:
   transmitting the compressed input image to a decoder system for decompression of the input image.

6. The method of claim 1, wherein the encoder neural network is a recurrent neural network with a binarizer output layer.

7. The method of claim 6, wherein the encoder input for a first iteration of the plurality of iterations is the input image.

8. The method of claim 6, wherein the encoder input for each iteration of the plurality of iterations after the first iteration is a residual image between (i) the input image and (ii) a reconstruction generated by a decoder neural network from the set of binary codes at the previous iteration, wherein the decoder neural network is a recurrent neural network that is configured to, at each of the plurality of iterations, receive a decoder input comprising the set of binary codes at the iteration and to process the decoder input to generate a reconstruction of the input image.

9. The method of claim 8, wherein determining whether a reconstruction error of the tile when reconstructed from binary codes at the previous iterations satisfies an error threshold comprises:

determining the reconstruction error for a portion corresponding to the tile in the residual image that is the encoder input at the iteration.

10. A system comprising one or more computers and one or more storage devices storing instructions that when executed by the one or more computers cause the one or more computers to perform operations comprising:

receiving a request to generate an encoded representation of an input image; and generating the encoded representation of the input image, wherein the encoded representation includes a respective set of binary codes at each of a plurality of iterations, wherein each set of binary codes includes a respective subset of binary codes for each of a plurality of tiles in the input image, and wherein the generating comprises, for each of the plurality of iterations:

processing an encoder input for the iteration using an encoder neural network, wherein the encoder neural network is configured to process the encoder input to generate an initial set of binary codes for the iteration, the initial set of binary codes including a respective subset of initial binary codes for each of the plurality of tiles; and generating the set of binary codes for the iteration from the initial set of binary codes, comprising:

for any tiles that have already been masked off during any previous iteration of the plurality of iterations:

masking off the tile by setting each of the binary codes for the tile in the set of binary codes to zero;

for any tiles that have not yet been masked off during any of the previous iterations of the plurality of iterations:

determining whether a reconstruction error of the tile when reconstructed from binary codes at the previous iterations satisfies an error threshold; and when the reconstruction quality satisfies the error threshold, masking off the tile by setting each of the binary codes for the tile in the set of binary codes to zero.

11. The method of claim 10, wherein generating the set of binary codes for the iteration further comprises:

when the reconstruction error does not satisfy the error threshold, refraining from modifying the initial binary codes for the tile.

12. One or more computer storage media storing instructions that when executed by one or more computers cause the one or more computers to perform operations comprising:

receiving a request to generate an encoded representation of an input image; and generating the encoded representation of the input image, wherein the encoded representation includes a respective set of binary codes at each of a plurality of iterations, wherein each set of binary codes includes a respective subset of binary codes for each of a plurality of tiles in the input image, and wherein the generating comprises, for each of the plurality of iterations:

processing an encoder input for the iteration using an encoder neural network, wherein the encoder neural network is configured to process the encoder input to generate an initial set of binary codes for the iteration, the initial set of binary codes including a respective subset of initial binary codes for each of the plurality of tiles; and generating the set of binary codes for the iteration from the initial set of binary codes, comprising:

for any tiles that have already been masked off during any previous iteration of the plurality of iterations:

masking off the tile by setting each of the binary codes for the tile in the set of binary codes to zero;

for any tiles that have not yet been masked off during any of the previous iterations of the plurality of iterations:

determining whether a reconstruction error of the tile when reconstructed from binary codes at the previous iterations satisfies an error threshold; and when the reconstruction quality satisfies the error threshold, masking off the tile by setting each of the binary codes for the tile in the set of binary codes to zero.

* * * * *